(12) United States Patent
Dettinger et al.

(10) Patent No.: US 7,472,116 B2
(45) Date of Patent: Dec. 30, 2008

(54) METHOD FOR FILTERING QUERY RESULTS USING MODEL ENTITY LIMITATIONS

(75) Inventors: Richard D. Dettinger, Rochester, MN (US); Daniel P. Kolz, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 11/316,265

(22) Filed: Dec. 22, 2005

(65) Prior Publication Data
US 2007/0150459 A1    Jun. 28, 2007

(51) Int. Cl.
*G06F 7/00* (2006.01)
(52) U.S. Cl. .............................................. 707/3; 707/7
(58) Field of Classification Search ........................ 707/3
See application file for complete search history.

(56) References Cited

U.S. PATENT DOCUMENTS

| | | | |
|---|---|---|---|
| 6,708,186 B1* | 3/2004 | Claborn et al. .............. 707/102 |
| 6,725,227 B1 | 4/2004 | Li | |
| 2003/0167274 A1* | 9/2003 | Dettinger et al. ............ 707/100 |
| 2003/0172056 A1* | 9/2003 | Dettinger et al. ................ 707/3 |
| 2004/0073539 A1* | 4/2004 | Dettinger et al. ................ 707/3 |
| 2004/0225641 A1* | 11/2004 | Dettinger et al. ................ 707/3 |
| 2006/0004794 A1* | 1/2006 | Pizzo et al. .................. 707/100 |

OTHER PUBLICATIONS

Dettinger, et al., U.S. Appl. No. 10/083,075, filed Feb. 26, 2002, "Application Portability and Extensibility Through Database Schema and Query Abstraction".

* cited by examiner

*Primary Examiner*—Mohammad Ali
*Assistant Examiner*—Anh Tai V Tran
(74) *Attorney, Agent, or Firm*—Patterson & Sheridan, LLP

(57) ABSTRACT

A method to process database queries are disclosed. One embodiment comprises receiving an abstract query against a database having a multiplicity of data records. The abstract query identifies a model entity that defines a focus of the abstract query. The method further comprises receiving a limitation request configured to restrict a result set for the abstract query. The limitation request specifies a limitation on data records that are returned for one or more instances of the underlying model entity. From the abstract query, an executable query capable of being executed by a query engine is generated. The executable query is modified on the basis of the limitation request. The modified executable query is executed against the database to obtain the result set, whereby the result set is restricted as requested by the limitation request.

9 Claims, 7 Drawing Sheets

1

METHOD FOR FILTERING QUERY RESULTS USING MODEL ENTITY LIMITATIONS

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to processing of database queries and, more particularly, to filtering of query results based on limitations associated with an entity being queried.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations. Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Any requesting entity, including applications, operating systems and users, can issue queries against data in a database. Queries may be predefined (i.e., hard coded as part of an application) or may be generated in response to input (e.g., user input). Upon execution of a query against a database, a result set is returned to the requesting entity.

One of the difficulties for users in running queries is to discern relevant information from result sets. In particular, the users often attempt to understand the result set from the perspective of "entities", that is users often associate query results with a logical entity related to the result set. For example, in a medical data environment the focus of research is often on patients, a type of entity. Most of the relevant data in a medical data environment is in the form of continuous ranges of values, meaning that patients can have a multiplicity of tests with different values for each test. As a result, a given result set may contain a multiplicity of data records for each patient.

For instance, assume a researcher who performs a statistical analysis in a hospital to determine information about patients on which one or more hemoglobin tests were performed within a time when the patients were taking a particular drug. Furthermore, assume the researcher wants to view a display of only the top three hemoglobin test values for each patient. Doing so may assist the researcher in identifying patients with abnormally high hemoglobin levels. By way of example, assume that such abnormally high hemoglobin values can be used to identify whether further diagnostic tests on concerned patients are required.

Assume now that the researcher issues a single query against one or more underlying databases to determine the required information about the patients. Assume further that the query is executed against the underlying database(s), whereby a single result set is obtained having a multiplicity of data records for each patient. In order to view a display of only the top three hemoglobin test values for each patient, the researcher needs to identify manually the relevant data record(s) from the obtained result set. However, the process of manually identifying the relevant data records from the result set is a tedious process which is error prone and time consuming, particularly where the result set is voluminous.

Therefore, there is a need for an efficient technique for restricting a number of data records returned in a result set for a query, in particular, where a query may focus on some data related to instances of an entity being queried.

SUMMARY OF THE INVENTION

The present invention is generally directed to a method for filtering query results and, more particularly, for restricting a number of data records returned in a result set for a query.

One embodiment of the invention includes a computer-implemented method of processing a database query against a database having a multiplicity of data records. The method generally includes receiving, from a requesting entity, an abstract query, the abstract query identifying a model entity that defines a focus of the query and comprising at least a result field specification including one or more result fields for which data is to be returned from the database, wherein the model entity is defined in a data abstraction model abstractly describing the data in the database. The method generally further includes receiving a limitation request configured to restrict a result set for the abstract query, the limitation request specifying a limitation regarding a set data records that are returned for one or more instances of the underlying model entity in response to the query and generating, from the abstract query and with respect to the data abstraction model, an executable query capable of being executed by a query engine. The method still generally further includes modifying the executable query on the basis of the limitation request, executing the modified executable query against the database to obtain the result set, whereby the result set is restricted as requested by the limitation request, and outputting the restricted result set to the requesting entity.

Another embodiment of the invention includes a computer-readable medium containing a program which, when executed by a processor, performs operations for processing a database query against a database having a multiplicity of data records. The operations generally include receiving, from a requesting entity, an abstract query, the abstract query identifying a model entity that defines a focus of the query and comprising at least a result field specification including one or more result fields for which data is to be returned from the database, wherein the model entity is defined in a data abstraction model abstractly describing the data in the database, and receiving a limitation request configured to restrict a result set for the abstract query, the limitation request specifying a limitation regarding a set data records that are returned for one or more instances of the underlying model entity in response to the query. The operations generally further include generating, from the abstract query and with respect to the data abstraction model, an executable query capable of being executed by a query engine, modifying the executable query on the basis of the limitation request, executing the modified executable query against the database to obtain the result set, whereby the result set is restricted as requested by the limitation request, and outputting the restricted result set to the requesting entity.

Still another embodiment of the invention provides a computer-readable medium containing a program which, when executed by a processor, performs operations for processing a database query against a database having a multiplicity of data records. The operations generally include receiving, from a requesting entity, an abstract query, the abstract query identifying a model entity that defines a focus of the query and comprising at least a result field specification including one or more result fields for which data is to be returned from the database, wherein each result field of the abstract query is a logical field of a data abstraction model abstractly describing the data in the database, the data abstraction model being configured to allow generating an executable query into a form consistent with a physical representation of the data in the database on the basis of the one or more logical fields of the abstract query. The operations generally further include receiving a limitation request configured to restrict a result set for the abstract query, the limitation request specifying a limitation regarding a set data records that are returned for one or more instances of the underlying model entity in response to the query, generating, from the abstract query, an executable query capable of being executed by a query engine. The operations still generally further include, modifying the executable query on the basis of the limitation request, executing the modified executable query against the database to obtain the result set, whereby the result set is restricted as requested by the limitation request, and outputting the restricted result set to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
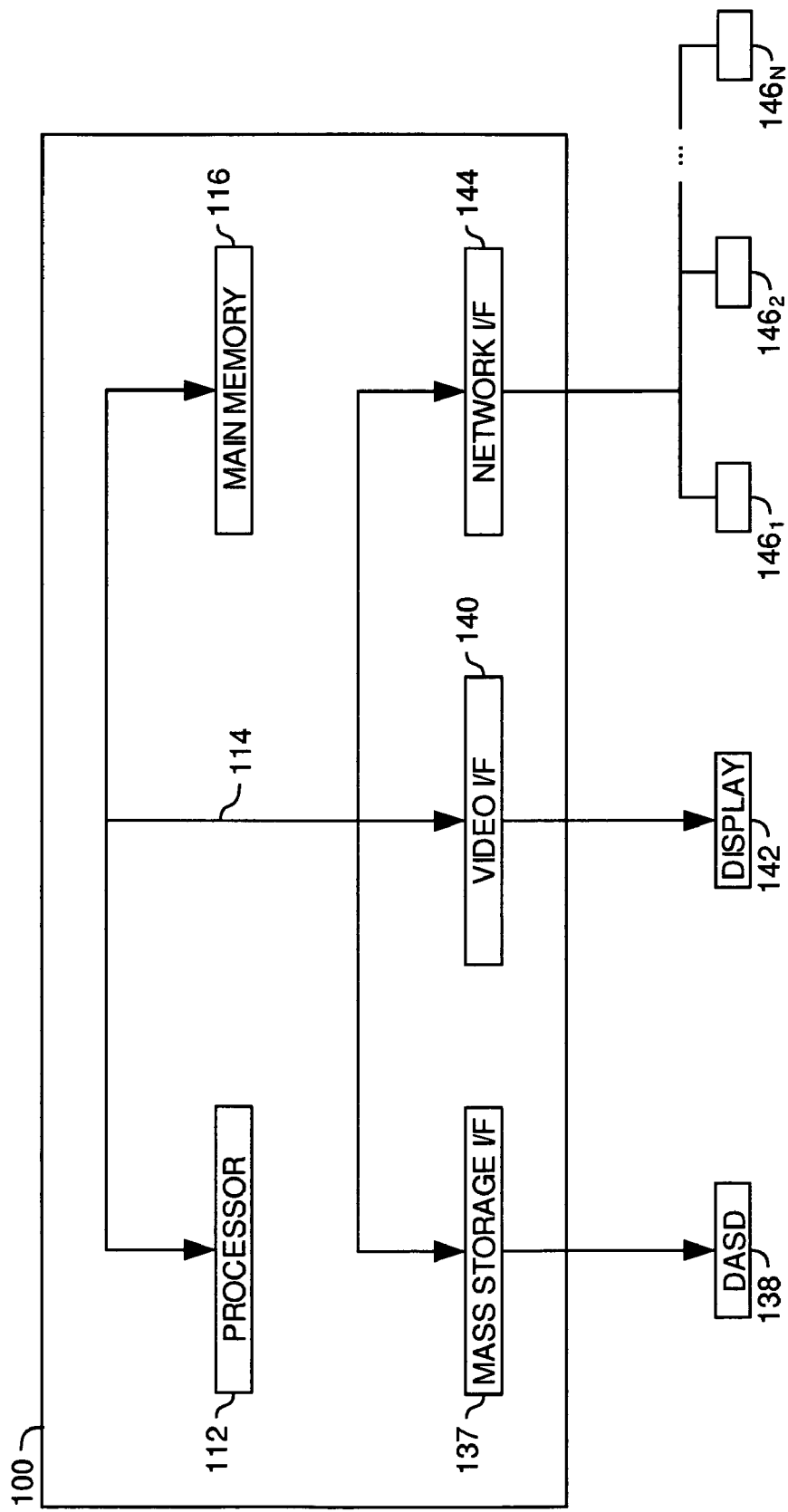
FIG. 1 illustrates a computer system that may be used in accordance with the invention.

The present invention is generally directed to a method, system and article of manufacture for filtering query results and, more particularly, for restricting a number of data records returned in a result set for a query based on a model entity limitation. In general, a result set for a query is obtained in response to execution of a query against one or more underlying databases, each having a multiplicity of data records. The query includes at least one result field for which data from the underlying database(s) is to be returned in the result set.

According to one aspect, the multiplicity of data records in the underlying database(s) is accessed using one or more data abstraction models that abstractly describe physical data in the underlying database(s). Thus, using a data abstraction model, abstract queries against the physical data can be constructed without regard for structure or representation used by an underlying physical database. The query elements provided by the data abstraction model are used to generate an executable query from the abstract query. For example, as descried in greater detail below, the query elements used to compose an abstract query may define an access method used to map from the logical representation of a query element presented to a user to a physical representation used by the underlying physical database. The executable query is generated in a form consistent with a physical representation of the physical data. In one embodiment, an abstract query identifies a model entity that defines a focus of data records to be returned in a result set for the abstract query, such as, for example, the patients of a medical institution. In general, the "model entity" defines a focus from the perspective of a user or application submitting the query.

In one embodiment, an abstract query may be associated with a limitation request, which is used to restrict a result set of data records responsive to the abstract query. To this end, the limitation request specifies a limitation on data records that are returned in the result set for one or more instances of the underlying model entity. For instance, the limitation request may indicate a maximum number of data records to be returned per patient (or other model entity as the case may be) from the underlying database(s). On the basis of the abstract query, an executable query capable of being executed by a query engine is generated. The executable query is modified on the basis of the limitation request to reflect the requested limitation. Then, the modified executable query is executed against the underlying database(s) to obtain a filtered result set which is restricted as requested by the limitation request.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Creation and Execution Environment

Figure 2:
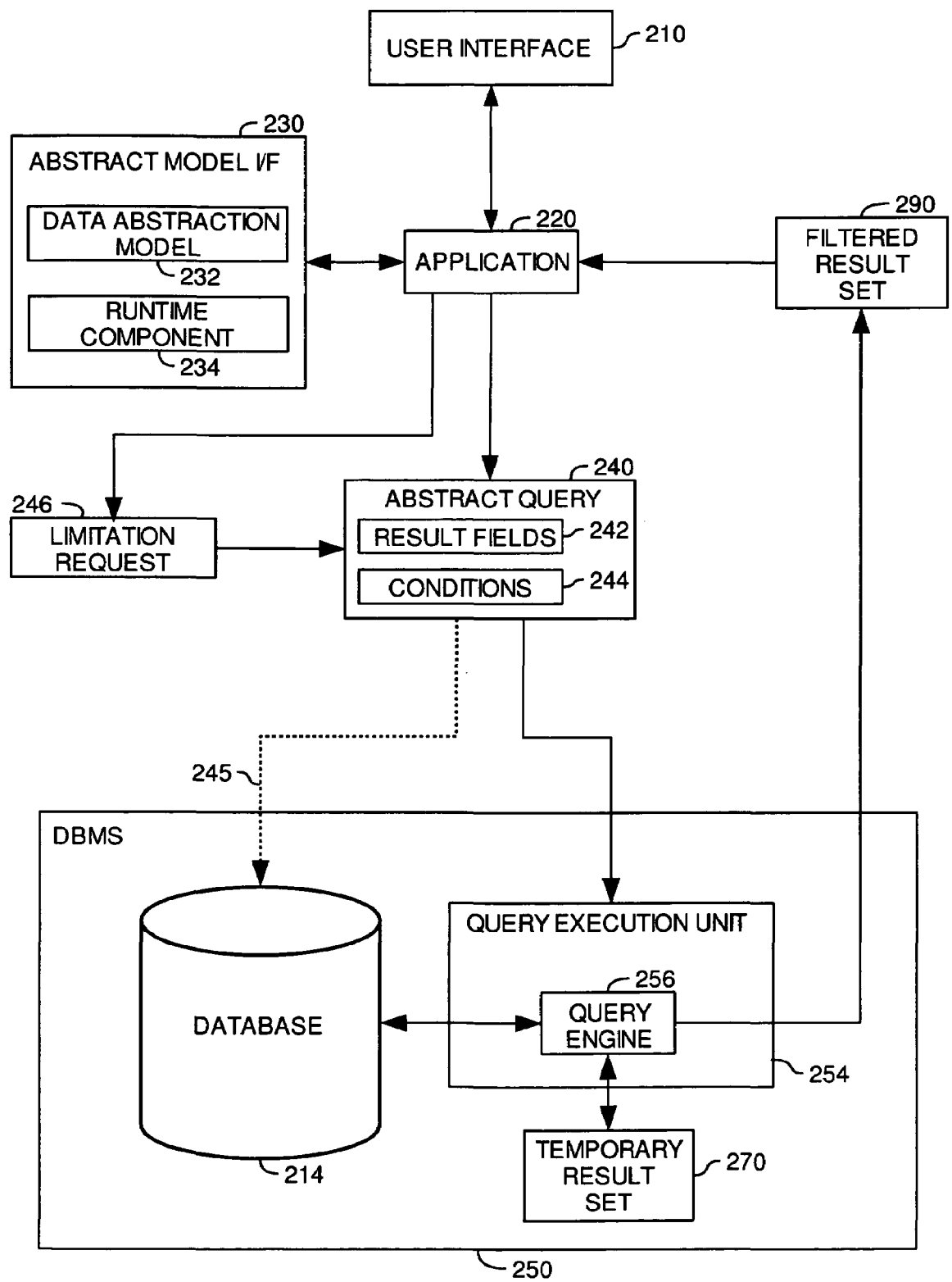
FIG. 2 is a relational view of software components defining a query creation and execution environment in one embodiment.

Referring now to FIG. 2, a relational view of software components in one embodiment is illustrated. The software components illustratively include a user interface 210, a DBMS 250, one or more applications 220 (only one application is illustrated for simplicity) and an abstract model interface 230. The abstract model interface 230 illustratively provides an interface to a data abstraction model 232 and a runtime component 234. The DBMS 250 illustratively includes a database 214 and a query execution unit 254 having a query engine 256.

According to one aspect, the application 220 (and more generally, any requesting entity) issues queries against the database 214. The database 214 is shown as a single database for simplicity. However, a given query can be executed against multiple databases which can be distributed relative to one another. Moreover, one or more databases can be distributed to one or more networked devices (e.g., networked devices 146 of FIG. 1). The database 214 is representative of any collection of data regardless of the particular physical representation of the data. A physical representation of data defines an organizational schema of the data. By way of illustration, the database 214 may be organized according to a relational schema (accessible by SQL queries) or according to an XML schema (accessible by XML queries). However, the invention is not limited to a particular schema and contemplates extension to schemas presently unknown. As used herein, the term "schema" refers to a particular arrangement of data.

The queries issued by the application 220 may be predefined (i.e., hard coded as part of the application 220) or may be generated in response to input (e.g., user input). In one embodiment, the queries issued by the application 220 can be created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 214 (e.g., the application 220, an operating system or an end user). Accordingly, all such implementations are broadly contemplated.

In one embodiment, the queries issued by the application 220 are composed using the abstract model interface 230. In other words, the queries are created on the basis of logical fields defined by the data abstraction model 232. Such queries are referred to herein as "abstract queries". The runtime component 234 may be configured to translate an abstract query into a query for execution. Such queries are referred to herein as "concrete" or "physical" queries. An exemplary abstract model interface is described below with reference to FIGS. 3A-6.

Illustratively, the application 220 issues an abstract query 240 which is related to a model entity that defines a focus of data records to be returned from the database 214 in a result set for the abstract query 240. For example, assume that the database 214 includes information that is related to patients of a medical institution. Accordingly, the abstract query 240 can be related to the model entity "Patient" that represents the focus of the data records. However, it should be noted that the data records in the database 214 can be related to more than one model entity. For instance, while a portion of the data records relates to the "Patient" model entity, another portion may relate to an "Employee" model entity that focuses on data records having information with respect to employees of the medical institution. Further, some data records may be associated with more than one model entity. All such implementations are broadly contemplated.

The abstract query 240 illustratively includes one or more result fields 242 for which data from the database 214 is to be returned, and one or more conditions 244. The conditions 244 are configured for filtering which data record(s) contained in the database 214 is (are) returned for each of the result fields 214. However, it should be noted that the conditions 244 are merely illustrated by way of example. In other words, other embodiments are contemplated where abstract queries without conditions are implemented.

In one embodiment, the abstract query 240 is associated with a limitation request 246 which is configured to restrict a result set for the abstract query 240. The limitation request 246 specifies a limitation on data records that are returned from the database 214 for one or more instances of the underlying model entity.

According to one aspect, the user may use the user interface 210 to specify the limitation request 246. To this end, the user interface 210 may be configured to display one or more suitable graphical user interface (GUI) screens for specification of the limitation request 246. For instance, a GUI screen can be configured to display a plurality of user-selectable elements, each representing a model entity that defines a focus of data records included with the database 214. Assume now that in the given example the GUI screen displays the "Patient" model entity and the "Employee" model entity as user-selectable elements and that the user selects the "Patient" model entity for specification of the limitation request 246. The GUI screen may further display graphical elements which allow selection of a logical field of the data abstraction model 232 on which a limitation is to be defined in the limitations request 246. Assume now that the user selects a "Hemoglobin" field having hemoglobin test values for the patients of the medical institution. The graphical elements may further be configured to allow selection of a requested limitation on the selected logical field. By way of example, the graphical elements may display pushbuttons for selection of a "Top", "Highest", "Lowest", "Bottom", "Most Recent" limitation on the selected logical field. Assume now that the user has pushed the pushbutton "Top". The GUI screen may then display an input field that allows by way of example for input of a maximum allowed number of data records to be returned in a corresponding result set per instance of the selected model entity. In other words, in the given example the limitation consists in limiting the number of data records to be returned per instance of the model entity to a maximum allowed number. Assume now that the user inputs a value "3" into the displayed input field. Accordingly, in the given example the user has specified the limitation request 246 such that the top 3 hemoglobin test values per patient are returned at most.

However, using a GUI to specify the limitation request 246 is merely described by way of example and not meant to be limiting of the invention. In other words, any possible technique for specifying the limitation request 246 is broadly contemplated. Furthermore, it should be noted that allowing selection of any logical field of the data abstraction model 232 for specification of the limitation request 246 may lead to useless limitations in the limitation request 246. More specifically, assume that the user selects a "Patient ID" and a "Hemoglobin" field as the result fields 242 of the abstract query 240 and then indicates in the limitation request 246 to limit a corresponding result set to data records that are related to the "Patient" model entity. Assume further that the limitation request 246 indicates to limit the data records to data records that are related to the three oldest patients, i.e., with respect to a logical field "Age". However, as the abstract query 240 is not configured to retrieve data for a logical field "Age" that is required to define such a limitation, this limitation would not effect the result set. Therefore, according to one aspect, the limitation request 246 can only be specified for one of the result fields 242 of the abstract query 240.

Furthermore, in one embodiment the result field that is selected for specification of the limitation request 246 refers to a logical field that returns data results that can be sorted, according to the limitation request 246. In one embodiment, each logical field of the data abstraction model 232 includes metadata indicating whether the underlying data can be sorted. More specifically, sorting the data needs to be possible independent of the underlying data type. By way of example, sorting can be performed on character data, integer values, floating point values, dates and timestamps. Sorting the data allows identification of the "Top", "Highest", "Lowest", "Bottom" and/or "Most Recent" data values for the selected result field that is used to define the limitation request 246. In other words, sorting the data values allows the limitation request 246 to be applied to the data that is retrieved for the abstract query 240. For example, where the user has specified the limitation request 246 such that the top 3 hemoglobin test values per patient should be returned, the hemoglobin values for each patient can be sorted in descending order such that a list is generated for each patient. Accordingly, in the list of a given patient, the first three values on top of the list are the 3 values to be returned.

On the basis of the abstract query 240, the runtime component 234 generates an executable query capable of being executed by the query engine 256 using the data abstraction model 232. The executable query is then modified by the runtime component 234 on the basis of the limitation request 246 to reflect the requested limitation. One embodiment of the operations of the runtime component 234 for generating and modifying the executable query is described in more detail below with reference to FIGS. 4-6.

The modified executable query is submitted to the query execution unit 254 for execution against the database 214 and executed using the query engine 256 to determine a temporary result set 270. Note, as shown, the query execution unit 254 includes only the query engine 256, for simplicity. However, the query execution unit 254 may include other components, such as a query parser and a query optimizer. A query parser is generally configured to accept a received query input from a requesting entity, such as the application(s) 220, and then parse the received query. The query parser may then forward the parsed query to the query optimizer for optimization. A query optimizer is an application program which is configured to construct a near optimal search strategy (known as an "access plan") for a given set of search parameters, according to known characteristics of an underlying database (e.g., the database 214), an underlying system on which the search strategy will be executed (e.g., computer system 110 of FIG. 1), and/or optional user specified optimization goals. In general such search strategies determine an optimized use of available hardware/software components to execute a query. Once an access plan is selected, the query engine 256 then executes the query according to the access plan.

When executing the executable query against the database 214, the query engine 256 identifies each data record of the database 214 that satisfies the abstract query 240. Each identified data record is included with the temporary result set 270. Then, in one embodiment, the query engine 256 filters the temporary result set 270 according to the limitation request 246. Thereby, a filtered result set 290 is generated which is restricted as requested by the limitation request 246. The filtered result set 290 is then returned to the application 220.

Logical/Runtime View of Environment

Figure 3A:
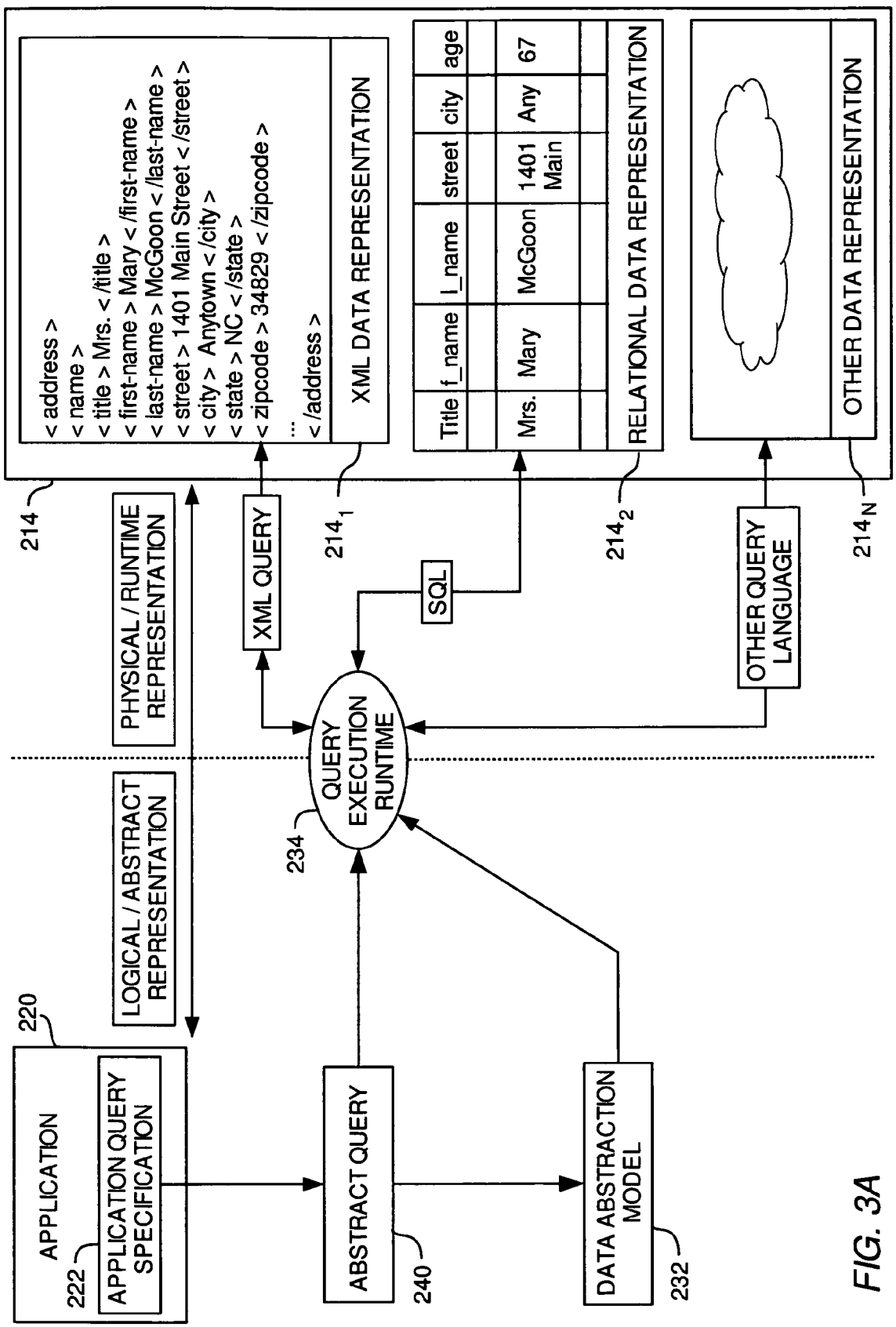
FIGS. 3A-3B are relational views of software components defining an abstract query creation and execution environment in one embodiment.
Figure 3B:
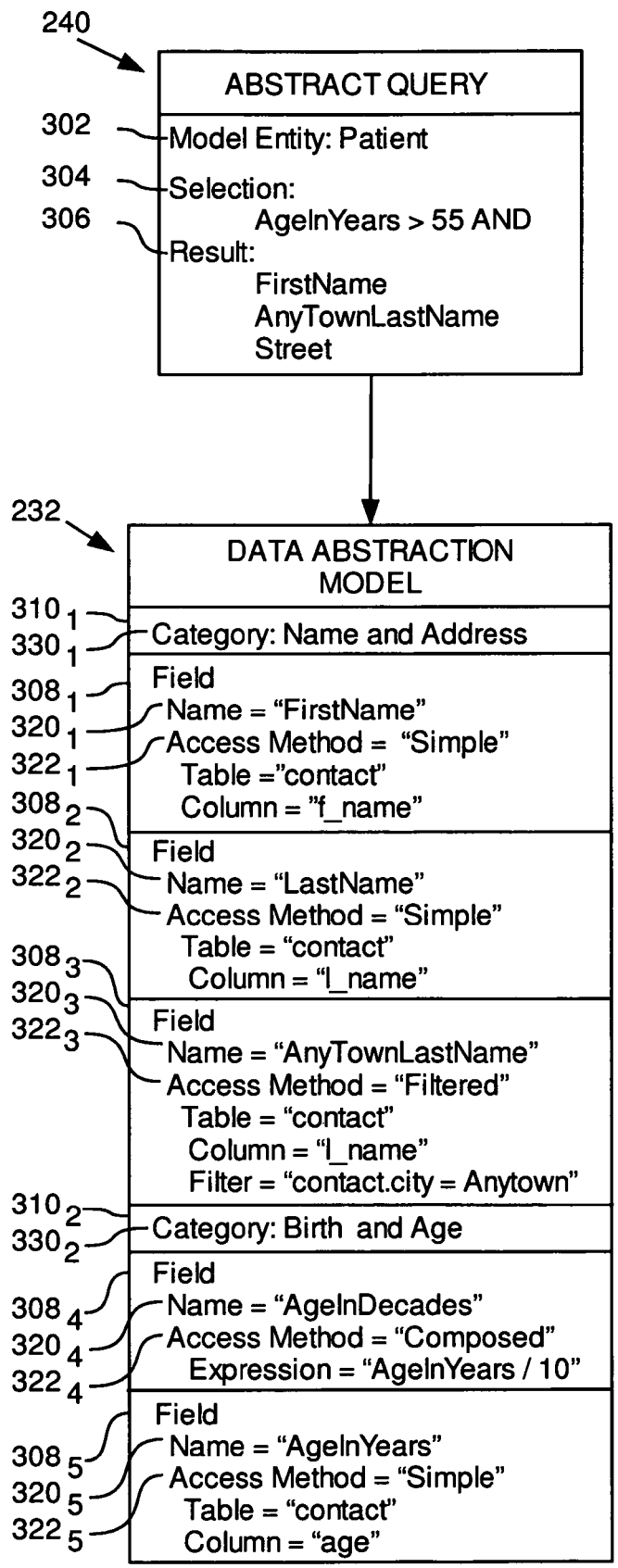

FIGS. 3A-3B illustrate a relational view of software components in one embodiment. According to one aspect, the software components are configured for query execution management and illustratively include the application 220, the data abstraction model 232, the runtime component 234 and the database 214 of FIG. 2. By way of example, the database 214 includes a plurality of exemplary physical data representations $214_1, 214_2, \ldots 214_N$.

As noted above with reference to FIG. 2, the application 220 issues the abstract query 240 against the database 214. In one embodiment, the application 220 issues the query 240 as defined by a corresponding application query specification 222. The abstract query 240 is composed according to logical fields rather than by direct reference to underlying physical data entities in the database 214. The logical fields are defined by the data abstraction model 232 which generally exposes information as a set of logical fields that may be used within a query (e.g., the abstract query 240) issued by the application 220 to specify criteria for data selection and specify the form of result data returned from a query operation. Furthermore, the abstract query 240 may include a reference to an underlying model entity that specifies the focus for the abstract query 240 (model entity 302). In one embodiment, the application query specification 222 may include both criteria used for data selection (selection criteria 304; e.g., conditions 244 of FIG. 2) and an explicit specification of the fields to be returned (return data specification 306; e.g., result fields 242 of FIG. 2) based on the selection criteria 304, as illustrated in FIG. 3B.

The logical fields of the data abstraction model 232 are defined independently of the underlying data representation (i.e., one of the plurality of exemplary physical data representations $214_{1-N}$) being used in the database 214, thereby allowing queries to be formed that are loosely coupled to the underlying data representation. More specifically, a logical field defines an abstract view of data whether as an individual data item or a data structure in the form of, for example, a database table. As a result, abstract queries such as the query 240 may be defined that are independent of the particular underlying data representation used. Such abstract queries can be transformed into a form consistent with the underlying physical data representation $214_{1-N}$ for execution against the database 214. By way of example, the abstract query 240 is translated by the runtime component 234 into an executable query which is executed against the database 214 to determine a corresponding result set (e.g., temporary result set 270 of FIG. 2) for the abstract query 240.

In one embodiment, illustrated in FIG. 3B, the data abstraction model 232 comprises a plurality of field specifications $308_1, 308_2, 308_3, 308_4$ and $308_5$ (five shown by way of example), collectively referred to as the field specifications 308 (also referred to as hereinafter as "field definitions"). Specifically, a field specification is provided for each logical field available for composition of an abstract query. Each field specification may contain one or more attributes. Illustratively, the field specifications 308 include a logical field name attribute $320_1, 320_2, 320_3, 320_4, 320_5$ (collectively, field name 320) and an associated access method attribute $322_1, 322_2, 322_3, 322_4, 322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 232 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 214 of FIG. 2). As illustrated in FIG. 3A, the access methods associate the logical field names to a particular physical data representation $214_{1-N}$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 232 contains field specifications (with associated access methods) for two or more physical data representations $214_{1-N}$. In an alternative embodiment, a different single data abstraction model 232 is provided for each separate physical data representation $214_{1-N}$.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3B maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3B in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3B the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 232 shown in FIG. 3B are representative of logical fields mapped to data represented in the relational data representation $214_2$ shown in FIG. 3A. However, other instances of the data abstraction model 232 map logical fields to other physical representations, such as XML.

An illustrative abstract query corresponding to the abstract query 240 shown in FIG. 3B is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (AgeInYears > "55"--> |
| 003 | <QueryAbstraction> |
| 004 |    <Selection> |
| 005 |       <Condition internalID="4"> |
| 006 |          <Condition field="AgeInYears" operator="GT" value="55" |
| 007 |             internalID="1"/> |
| 008 |    </Selection> |
| 009 |    <Results> |
| 010 |       <Field name="FirstName"/> |
| 011 |       <Field name="AnyTownLastName"/> |
| 012 |       <Field name="Street"/> |
| 013 |    </Results> |
| 014 |    <Entity name="Patient" > |
| 015 |       <EntityField required="Hard" > |
| 016 |          <FieldRef name="data://Demographic/Patient ID" /> |
| 017 |             <Usage type="query" /> |
| 018 |       </EntityField> |
| 019 |    </Entity> |
| 020 | </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria. The abstract query shown in Table I further includes a model entity specification in lines 014-019 which specifies that the query is a query of the "patient" model entity.

An illustrative data abstraction model (DAM) corresponding to the data abstraction model 232 shown in FIG. 3B is shown in Table II below. By way of illustration, the illustrative Data Abstraction Model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 |    <Category name="Name and Address"> |
| 004 |       <Field queryable="Yes" name="FirstName" displayable="Yes"> |
| 005 |          <AccessMethod> |
| 006 |             <Simple columnName="f_name" tableName="contact"></Simple> |
| 007 |          </AccessMethod> |
| 008 |       </Field> |

TABLE II-continued

DATA ABSTRACTION MODEL EXAMPLE

```
009             <Field queryable="Yes" name="LastName" displayable="Yes">
010                 <AccessMethod>
011                     <Simple columnName="l_name" tableName="contact"></Simple>
012                 </AccessMethod>
013             </Field>
014             <Field queryable="Yes" name="AnyTownLastName" displayable="Yes">
015                 <AccessMethod>
016                     <Filter columnName="l_name" tableName="contact"
017                         Filter="contact.city=Anytown"> </Filter>
018                 </AccessMethod>
019             </Field>
020         </Category>
021         <Category name="Birth and Age">
022             <Field queryable="Yes" name="AgeInDecades" displayable="Yes">
023                 <AccessMethod>
024                     <Composed columnName="age" tableName="contact"
025                         Expression="columnName/10"> </Composed>
026                 </AccessMethod>
027             </Field>
028             <Field queryable="Yes" name="AgeInYears" displayable="Yes">
029                 <AccessMethod>
030                     <Simple columnName="age" tableName="contact"></Simple>
031                 </AccessMethod>
032             </Field>
033         </Category>
034     </DataAbstraction>
```

By way of example, note that lines 004-008 correspond to the first field specification $308_1$ of the DAM 232 shown in FIG. 3B and lines 009-013 correspond to the second field specification $308_2$.

As was noted above, an executable query can be generated on the basis of the abstract query of Table I for execution against an underlying database (e.g., database 214 of FIG. 3A). An exemplary method for generating an executable query on the basis of an abstract query is described below with reference to FIGS. 4-6.

Generating an Executable Query on the Basis of an Abstract Query

Figure 4:
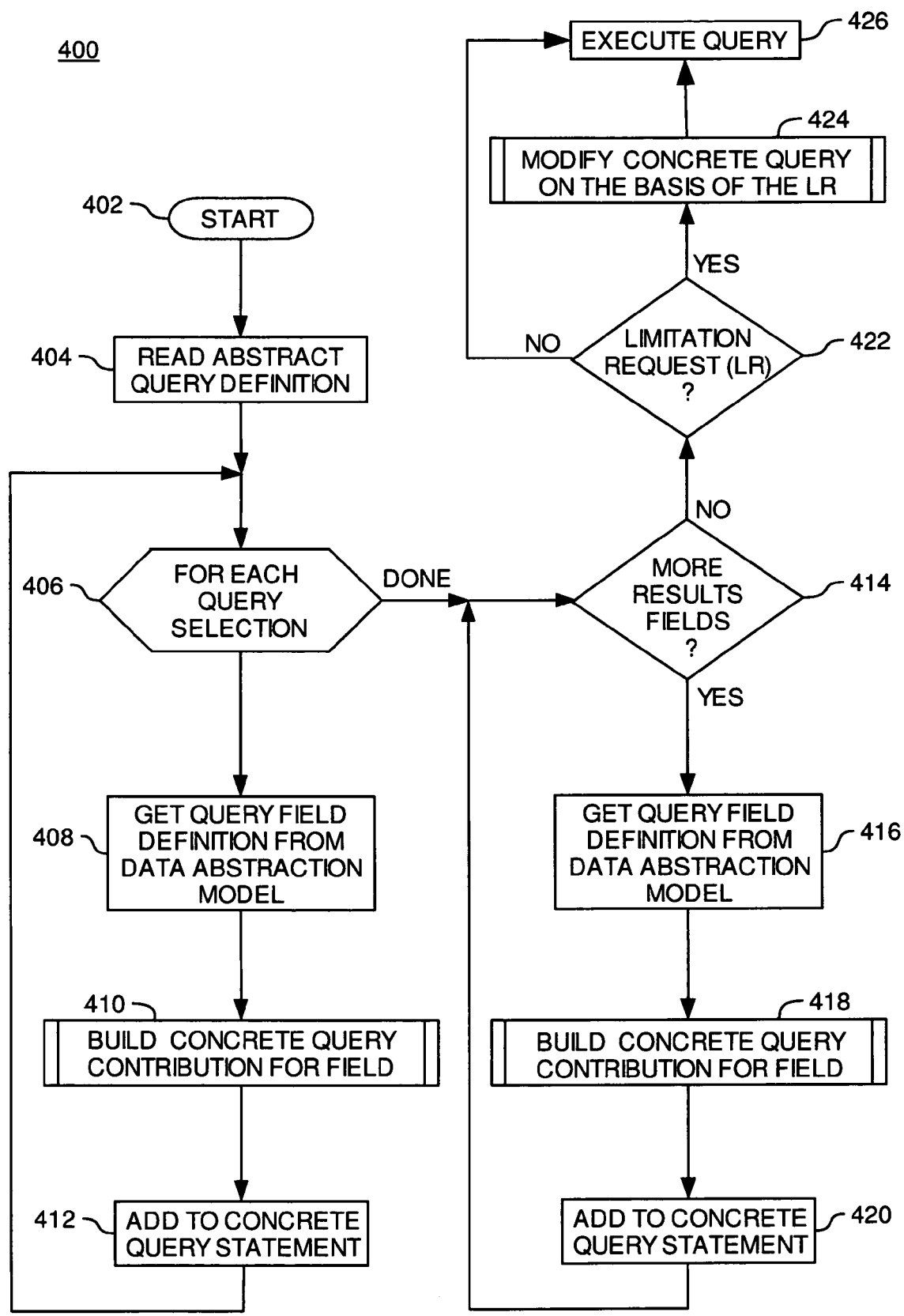
FIGS. 4-6 are flow charts illustrating the operation of a runtime component in one embodiment.

Referring now to FIG. 4, an illustrative runtime method 400 exemplifying one embodiment of generating an executable query (also referred to hereinafter as "concrete" query) on the basis of an abstract query (e.g., abstract query 240 of FIG. 2) using the runtime component 234 of FIG. 2 is shown. The method 400 is entered at step 402 when the runtime component 234 receives the abstract query (such as the abstract query shown in Table I) as input. At step 404, the runtime component 234 reads and parses the abstract query and locates individual selection criteria (e.g., conditions 244 of FIG. 2) and desired result fields (e.g., result fields 242 of FIG. 2).

At step 406, the runtime component 234 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 234 uses the field name from a selection criterion of the abstract query to look up the definition of the field in the data abstraction model 232. As noted above, the field definition includes a definition of the access method used to access the data structure associated with the field. The runtime component 234 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 214 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 234 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 234 looks up a result field name (from the result specification of the abstract query) in the data abstraction model 232 and then retrieves a result field definition from the data abstraction model 232 to identify the physical location of data to be returned for the current logical result field. The runtime component 234 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, processing continues at step 422.

At step 422, the runtime component 234 determines whether a limitation request (e.g., limitation request 246 of FIG. 2) is defined for the abstract query. If it is determined that no limitation request exists for the abstract query, processing continues at step 426. Otherwise, the concrete query is modified on the basis of the limitation request at step 424. An exemplary method of modifying a concrete query on the basis of an associated limitation request is described in more detail below with reference to FIG. 6. Processing then continues at step 426, where the concrete query is executed.

Figure 5:
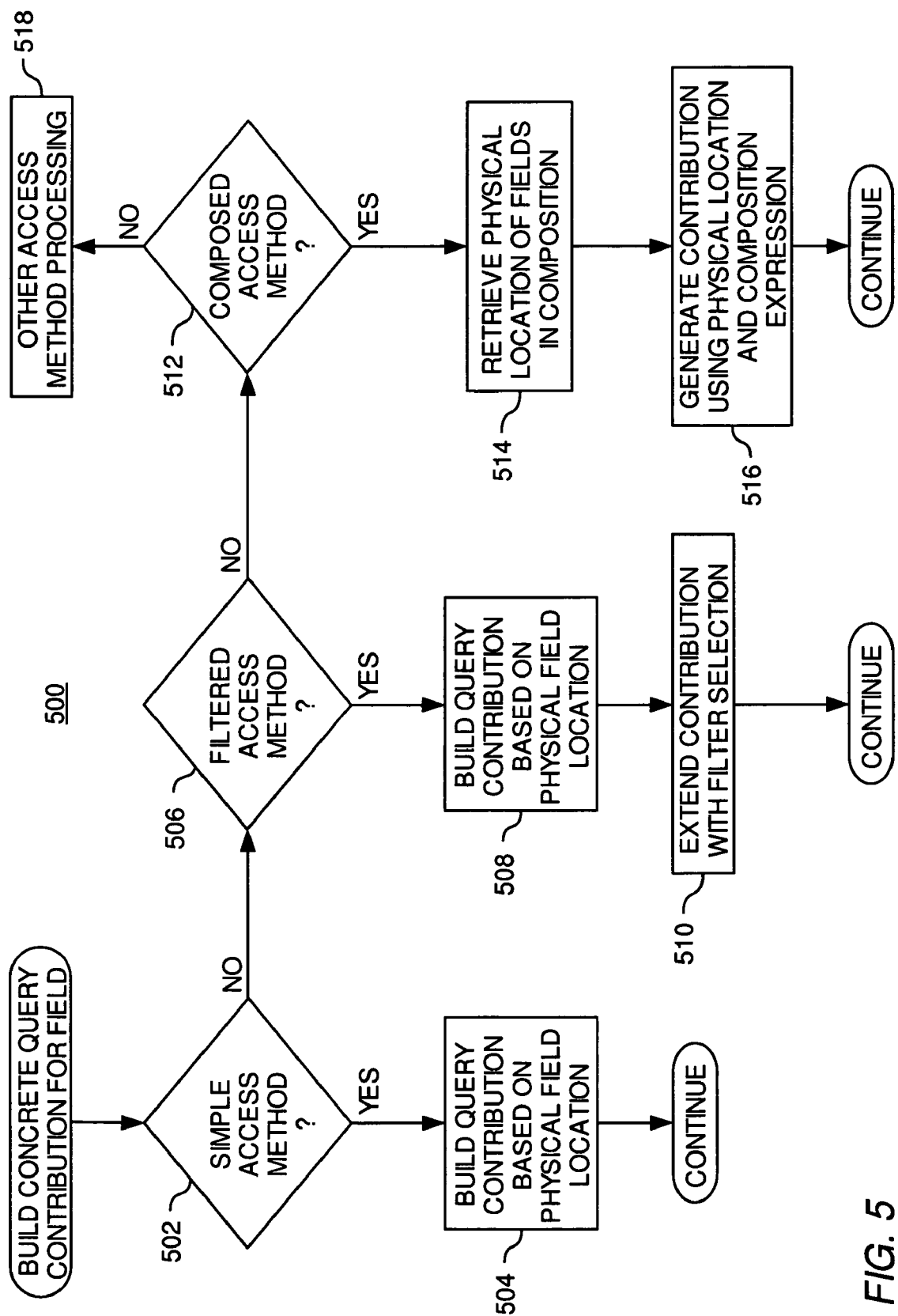

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 as described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Modifying a Concrete Query on the Basis of an Associated Limitation Request

Figure 6:
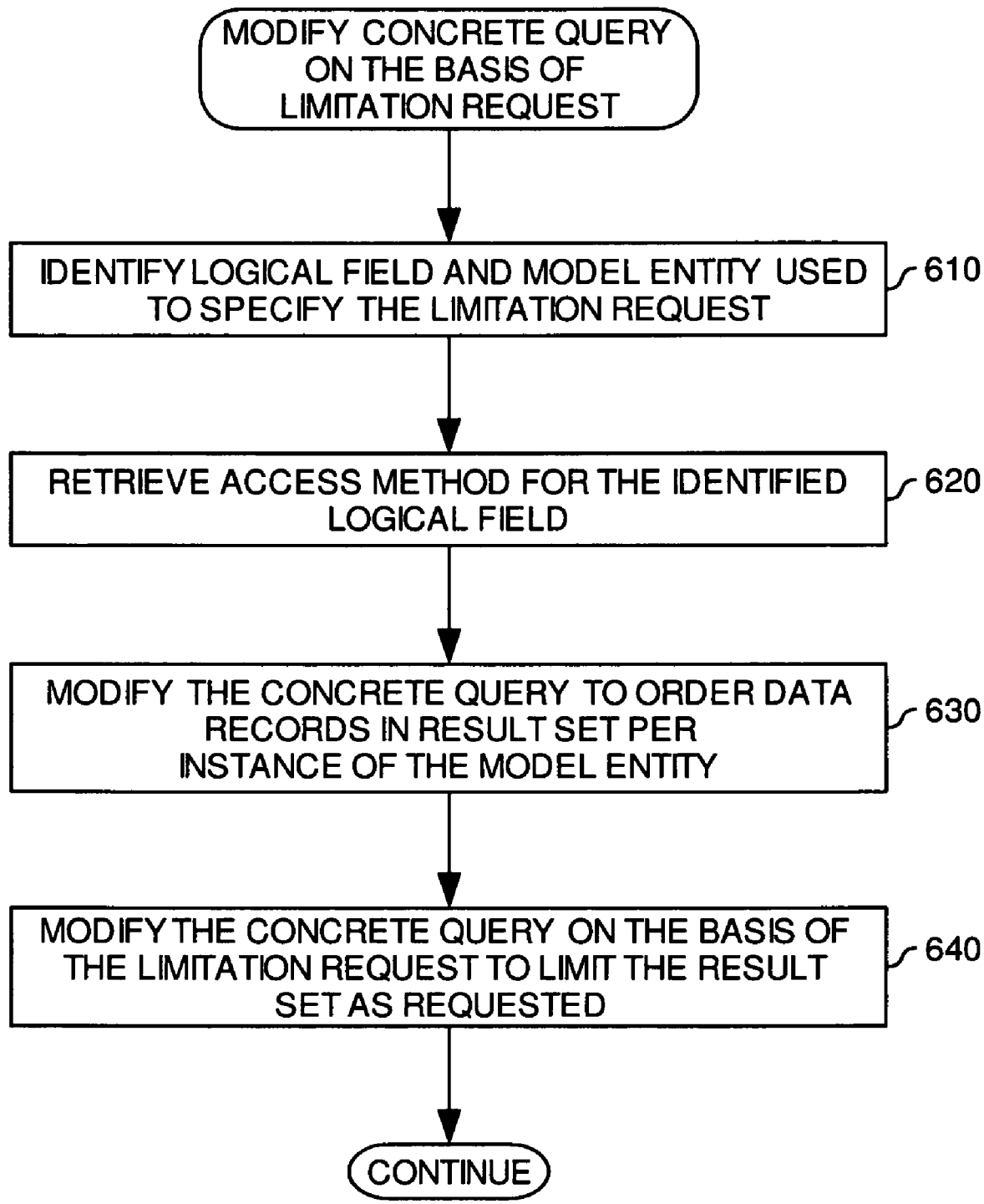

Referring now to FIG. 6, one embodiment of a method 600 for modifying a concrete query on the basis of an associated limitation request (e.g., limitation request 246 of FIG. 2) using the runtime component 234 of FIG. 2 is illustrated. According to one aspect, method 600 is entered from step 424 of FIG. 4.

Assume now by way of example that the exemplary concrete SQL query illustrated in Table III represents the concrete query that is modified according to the method 600. However, it should be noted that the exemplary query is defined in SQL for purposes of illustration and not for limiting the invention. For instance, persons skilled in the art will readily recognize corresponding XML representations, such as used to describe the exemplary abstract query of Table I. Therefore, all such different implementations are broadly contemplated.

TABLE III

| CONCRETE QUERY EXAMPLE | |
|---|---|
| 001 | SELECT |
| 002 | PatientID, Hemoglobin |
| 003 | FROM |
| 004 | Tests |

The exemplary query of Table III is configured to retrieve hemoglobin test values ("Hemoglobin" in line 002) for patients of a medical institution. Each patient is uniquely identified by an associated patient identifier ("PatientID" in line 002). According to line 004, the hemoglobin test values and corresponding patient identifiers can be retrieved from an underlying "Tests" database table. However, it should be noted that the exemplary concrete query of Table III does not include any conditions (e.g., conditions 244 of FIG. 2), for brevity and simplicity.

Assume further that the exemplary concrete query of Table III is modified by the method 600 on the basis of the exemplary limitation request illustrated in Table IV below. As described above, the limitation request may be specified by a user interacting with a GUI or text based interface to compose an abstract query.

TABLE IV

| LIMITATION REQUEST EXAMPLE | |
|---|---|
| 001 | LIMIT RESULTS TO |
| 002 | Top 3 Hemoglobin values for each Patient |

The exemplary limitation request of Table IV is configured to limit a result set ("LIMIT RESULTS TO" in line 001) for the exemplary concrete query of Table III to a maximum of three data records per patient ("3 hemoglobin values for each patient" in line 002), that is, per instance of the "Patient" model entity. Only the data records having the greatest test values ("Top" in line 002) should be returned in the result set.

The method 600 is entered at step 610 where the limitation request of Table IV is parsed to identify the underlying model entity ("Patient" in line 002) and the logical field corresponding to the result field ("Hemoglobin" in line 002) on which a limitation is specified. Then, at step 620 the access method for the identified logical field is retrieved. In the given example, assume that the logical field "Hemoglobin" refers to a column "Hemoglobin" in the "Tests" table that is accessed according to a "Simple" access method.

At step 630, the exemplary concrete query of Table III is modified such that the data values for the "Hemoglobin" field are ordered in a corresponding temporary result set (e.g., temporary result set 270 of FIG. 2) per instance of the underlying model entity, i.e., per patient in this example. In the given example, the data records are partitioned with respect to the different patients who are identified by their associated patient identifiers and then ordered with respect to the hemoglobin test values. For example, if the underlying physical database is configured to receive and process SQL queries, an additional SQL select clause "PARTITION by PatientID ORDER BY Hemoglobin DESC" is added to the exemplary concrete query of Table III at line 002. By way of example, the ordering is performed in descending order ("DESC").

At step 640, the exemplary concrete query of Table III is further modified such that the data records in the temporary result set are filtered so that for each patient not more than three data records having the greatest hemoglobin test values of the patient are returned. Thus, a filtered result set (e.g., filtered result set 290 of FIG. 2) is generated which reflects the exemplary limitation request of Table IV.

In the given example, a row number is created for each data record in the temporary result set. In one embodiment, the data records of a given patient are numbered starting at row number "1". Then, for each subsequent data record of the given patient the row number is increased. Thus, the row numbers of the data records start at "1" for each patient. Accordingly, the additional select clause described above is modified to "rownumber() over (PARTITION by PatientID ORDER BY Hemoglobin DESC) as row_num".

Furthermore, a request to include a maximum of three data records per patient with the filtered result set is generated in the exemplary concrete query. Using the row numbers of the data records which are created as described above, only data records having row numbers which are less than or equal to three are included with the filtered result set. In other words, the condition "WHERE row_num<=3" is included with the exemplary concrete query of Table III. Accordingly, the exemplary modified concrete SQL query of Table V below is obtained.

TABLE V

MODIFIED CONCRETE QUERY EXAMPLE

| | |
|---|---|
| 001 | SELECT |
| 002 | PatientID, Hemoglobin, |
| 003 | rownumber( ) over (PARTITION by PatientID ORDER BY Hemoglobin DESC) |
| 004 | as row_num |
| 005 | FROM |
| 006 | Tests |
| 007 | WHERE |
| 008 | row_num <= 3 |

It should be noted, that the exemplary limitation request of Table IV is reflected in lines 003-004 and 007-008 of the exemplary modified concrete query of Table V. The method 600 then continues at step 426 of FIG. 4.

As was noted above with reference to FIG. 4, the modified concrete query is executed at step 426. In the given example, assume that the query of Table IV is executed against the underlying "Tests" database table which is not illustrated in more detail, for brevity. However, persons skilled in the art will readily recognize possible implementations and representations of the underlying Tests table. Accordingly, assume that the exemplary query result (e.g., filtered query result 290 of FIG. 2) illustrated in Table V below is obtained.

TABLE V

EXEMPLARY QUERY RESULT

| | PatientID | Hemoglobin | row_num |
|---|---|---|---|
| 001 | PatientID | Hemoglobin | row_num |
| 002 | 5000 | 3.90 | 1 |
| 003 | 5001 | 3.00 | 1 |
| 004 | 5002 | | −1 |
| 005 | 5003 | 6.81 | 1 |
| 006 | 5003 | 6.71 | 2 |
| 007 | 5003 | 1.00 | 3 |
| 008 | 5004 | 7.40 | 1 |
| 009 | 5004 | 1.40 | 2 |
| 010 | 5005 | | −1 |
| 011 | 5006 | 2.40 | 1 |

TABLE V-continued

EXEMPLARY QUERY RESULT

| | PatientID | Hemoglobin | row_num |
|---|---|---|---|
| 001 | PatientID | Hemoglobin | row_num |
| 012 | 5007 | | −1 |
| 013 | 5008 | 5.73 | 1 |

Illustratively, the exemplary query result of Table V includes the allowed maximum number of three data records data records for each patient. For example, lines (lines 005-007) illustrate the three greatest values for the patient identified by the patient identifier "5003". By way of example, assume that the underlying Tests table (and thus the temporary result set) includes ten data records for this patient having hemoglobin test values below 1.00 (the value of the third test for this patient), which are thus filtered. However, for the patients having the patient identifiers 5000, 5001, 5004, 5006 and 5008 (lines 002, 003, 008, 009, 011 and 013) less than three data records are returned showing only one or two hemoglobin values for each of these patients. Furthermore, for the patients having the patient identifiers 5002, 5005 and 5007 (lines 004, 010 and 012) no hemoglobin values could be retrieved in the Tests table and, thus, no hemoglobin values are shown for these patients.

It should be noted that the exemplary limitation request of Table IV is applied to records of each patient for whom data records exist in the underlying Tests table. Different implementations may allow different granularities for the requested limitations. For instance, the exemplary limitation request of Table IV can be refined with respect to one or more particular patients. By way of example, assume that the exemplary limitation request illustrated in Table VI below is associated with the exemplary concrete query of Table III. For simplicity, the exemplary limitation request of Table VI is also illustrated in natural language.

TABLE VI

LIMITATION REQUEST EXAMPLE

| | |
|---|---|
| 001 | LIMIT RESULTS TO |
| 002 | Top 3 Hemoglobin values for PatientID=5003 |

The exemplary limitation request of Table VI is configured to limit a result set ("LIMIT RESULTS TO" in line 001) for the exemplary concrete query of Table III to a maximum of three data records ("3 Hemoglobin values" in line 002) for a patient who is identified by the unique patient identifier "5003" ("for PatientID=5003" in line 002). In this example, the exemplary modified concrete SQL query of Table VII below is obtained.

TABLE VII

MODIFIED CONCRETE QUERY EXAMPLE

| | |
|---|---|
| 001 | SELECT |
| 002 | PatientID, Hemoglobin, |
| 003 | rownumber( ) over (PARTITION by PatientID ORDER BY Hemoglobin DESC) |
| 004 | as row_num |
| 005 | FROM |
| 006 | Tests |
| 007 | WHERE |
| 008 | row_num <= 3 AND PatientID=5003 |

It should be noted that the requested PatientID has been added as a condition in line 008 of the modified concrete query of Table VII. Thus, as illustrated in Tables VI and VII, multiple conditions may be included in a limitation request.

If the exemplary modified concrete query of Table VII is executed against the underlying Tests table, the exemplary query result (e.g., filtered query result 290 of FIG. 2) illustrated in Table VIII below is obtained.

TABLE VIII

EXEMPLARY QUERY RESULT

| 001 | PatientID | Hemoglobin | row_num |
|---|---|---|---|
| 002 | 5003 | 6.81 | 1 |
| 003 | 5003 | 6.71 | 2 |
| 004 | 5003 | 1.00 | 3 |

As can be seen from Table VIII, the exemplary query result (e.g., filtered query result 290 of FIG. 2) only contains data records for the patient who is identified by the unique patient identifier "5003".

While the foregoing is directed to embodiments of the present invention, other and further embodiments of the invention may be devised without departing from the basic scope thereof, and the scope thereof is determined by the claims that follow.

What is claimed is:

1. A computer-implemented method of processing a database query against a database having a multiplicity of data records, comprising:

receiving a selection of a model entity from a graphical user interface that provides a plurality of model entities for selection, each of the plurality of model entities being defined by a different plurality of logical fields defined in a data abstraction model abstractly describing data in the database; wherein the respective definition for each logical field specifies (i) a logical field name, (ii) a reference to an access method that is invoked to retrieve corresponding data in the database, and (iii) an attribute indicating whether the data to be returned from the database can be sorted;

receiving, from a requesting entity, an abstract query composed from a plurality of logical fields defined in the data abstraction model, the abstract query identifying the selected model entity that defines a focus of the query and comprising at least a result field specification including one or more result fields for which data is to be returned from the database;

receiving a limitation request configured to restrict a result set for the abstract query, the limitation request specifying a limitation regarding a maximum number of data records that are returned for one or more instances of the selected model entity in response to the query, wherein each data record returned for the one or more instances of the selected model entity has an associated row number, wherein only those data records having a row number less than or equal to the maximum number are returned, wherein the result set is partitioned with respect to the one or more instances of the selected model entity, wherein each partitioned result set includes the data records returned for the one or more instances of the selected model entity;

generating, from the abstract query and with respect to the data abstraction model, an executable query capable of being executed by a query engine;

modifying the executable query based on the limitation request;

executing the modified executable query against the database to obtain the result set, whereby the result set is restricted as requested by the limitation request; and outputting the restricted result set to the requesting entity.

2. The method of claim 1, wherein the underlying model entity corresponds to patients of a medical institution, whereby each of the multiplicity of data records in the database includes information related to a particular patient representing an instance of the underlying model entity.

3. The method of claim 1, wherein executing the modified executable query comprises:

generating a temporary result set that includes a set of data records that satisfies selection criteria specified by the abstract query; and filtering the temporary result set on the basis of the limitation request to generate the restricted result set.

4. The method of claim 1, wherein the limitation on data records that are returned for one or more instances of the underlying model entity defines a maximum number of allowed data records to be returned from the database for each instance of the underlying model entity.

5. The method of claim 1, wherein the limitation request refers to a selected result field of the abstract query.

6. The method of claim 1, wherein generating the executable query comprises:

generating a SQL query for execution against the database on the basis of the abstract query.

7. The method of claim 4, wherein executing the modified executable query comprises:

generating a temporary result set that satisfies the abstract query;

identifying, from the temporary result set, the maximum number of allowed data records for each instance of the underlying model entity as requested by the limitation request; and generating the restricted result set on the basis of the identified data records.

8. The method of claim 4, wherein the maximum number of allowed data records is defined by a predefined number of most significant data items for a given result field.

9. The method of claim 4, wherein the maximum number of allowed data records is defined by a predefined number of least significant data items for a given result field.

* * * * *